US007348701B2

(12) United States Patent
Baek

(10) Patent No.: US 7,348,701 B2
(45) Date of Patent: Mar. 25, 2008

(54) DRIVING UNIT AND IMAGE FORMING APPARATUS

(75) Inventor: Jung-gee Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/975,083

(22) Filed: Oct. 28, 2004

(65) Prior Publication Data

US 2005/0141921 A1 Jun. 30, 2005

(30) Foreign Application Priority Data

Dec. 27, 2003 (KR) ..................... 10-2003-0098049

(51) Int. Cl.
*H02K 5/00* (2006.01)
*G03G 15/00* (2006.01)

(52) U.S. Cl. ........................ 310/91; 399/117; 399/167; 310/75 R; 310/66; 74/606 R

(58) Field of Classification Search ............. 310/75 R, 310/91; 399/117
See application file for complete search history.

(56) References Cited

U.S. PATENT DOCUMENTS 2,957,360 A * 10/1960 Kripke ........................ 74/352
3,098,131 A * 7/1963 Gallagher et al. ....... 200/38 FA
3,336,446 A * 8/1967 Kuehnle ..................... 379/363
3,903,646 A * 9/1975 Norton ........................ 48/192
4,561,762 A * 12/1985 Watanabe et al. ........... 399/343
4,595,274 A * 6/1986 Sakurai ....................... 399/331
4,813,372 A * 3/1989 Kogure et al. ................ 118/60
4,993,356 A * 2/1991 Guslits ....................... 399/110
5,184,952 A * 2/1993 Nishikawa et al. ........... 432/60
5,291,242 A * 3/1994 Takano ....................... 399/119
5,298,957 A * 3/1994 Haupt et al. ................ 399/330
5,585,909 A * 12/1996 Behe et al. ................. 399/324
5,631,726 A * 5/1997 Sawada ...................... 399/111
5,701,549 A * 12/1997 Portig et al. .................. 399/36
5,740,696 A * 4/1998 Jean et al. ..................... 74/354
5,799,548 A * 9/1998 Brooks et al. ............ 74/606 R
5,950,052 A * 9/1999 Nomura et al. ............. 399/167
6,054,785 A * 4/2000 Kerdjoudj et al. .... 310/40 MM
6,390,683 B1 * 5/2002 Hirose et al. ............... 384/476
6,420,807 B1 * 7/2002 Tsujimoto et al. ............ 310/83
6,459,869 B2 * 10/2002 Nittani et al. ............... 399/111
6,463,234 B2 * 10/2002 Arimitsu et al. ............ 399/113
6,587,656 B2 * 7/2003 Lee et al. ...................... 399/90
6,617,726 B1 * 9/2003 Tsergas .................... 310/75 R
6,857,338 B2 * 2/2005 Tsergas .................... 74/606 R

FOREIGN PATENT DOCUMENTS

EP 71969 * 2/1983
JP 60-15664 * 1/1985
JP 01-1957558 8/1989

(Continued)

*Primary Examiner*—Burton Mullins
(74) *Attorney, Agent, or Firm*—Stanzione & Kim, LLP

(57) ABSTRACT

A driving unit including a motor, a support bracket supporting the motor, at least one stud supporting a gear which is rotated with a driving force of the motor, and a heatproof member disposed between a frame fastening the support bracket and the stud, and an image forming apparatus applying the same.

18 Claims, 2 Drawing Sheets

FOREIGN PATENT DOCUMENTS

| | | | |
|---|---|---|---|
| JP | 3-61978 | * | 3/1991 |
| JP | 07-237324 | | 9/1995 |
| JP | 8 216274 | * | 8/1996 |
| JP | 9-56117 | * | 2/1997 |
| JP | 2004-100923 | * | 4/2004 |
| KR | 2000-014183 | | 7/2000 |
| KR | 2003-0044228 | | 6/2003 |

* cited by examiner

DRIVING UNIT AND IMAGE FORMING APPARATUS

CROSS-REFERENCE TO RELATED APPLICATIONS

This application claims the benefit of Korean Application No. 2003-98049, filed Dec. 27, 2003, in the Korean Intellectual Property Office, the disclosure of which is incorporated herein in its entirety.

BACKGROUND OF THE INVENTION

1. Field of the Invention

The present general inventive concept relates to a driving unit and an image forming apparatus.

2. Description of the Related Art

General image forming apparatuses such as laser printers and photocopiers can include a pickup unit for picking up a paper by sheet, a developing unit for developing an image on the picked-up paper, a fusing unit for fusing the developed image on the paper with high temperature and pressure, and a paper-discharging unit.

The above units are mounted on a path in order to move the paper. On the path, a plurality of transfer rollers are mounted to move the paper.

A driving unit is provided in the image forming apparatus to drive the rollers of the respective units, and the transfer rollers. The driving unit generally comprises a motor, a support bracket supporting the motor, and a stud fixed by the support bracket and supporting a gear. The support bracket is fastened and supported by a frame of the image forming apparatus. One end of the stud may be fixed at the support bracket considering that the gear supported by the stud may be shaken, and can cause jittering. The other end of the stud may be supported by the frame.

However, in the above structure, the motor is subject to a great load since the motor has to drive several rollers at the same time. Therefore, the motor can heat up to approximately 100° C. If the high temperature is transmitted to the frame via the support bracket and the stud, a portion supporting the other end of the stud may expand by heat, and accordingly failing to stably support the stud. Therefore, the stud supported in a manner of a cantilever can tremble or shake. As a result, a driving force of the motor may not be stably transmitted.

SUMMARY OF THE INVENTION

Accordingly, it is an aspect of the present general inventive concept is to provide an apparatus that solves at least the above problems and/or disadvantages and to provide at least the advantages described below. It is a further aspect of the present general inventive concept is to provide an improved driving unit capable of preventing a driving heat of a motor from being transmitted to a frame through a stud, and an image forming apparatus having the same.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are achieved by providing a driving unit including a motor; a support bracket supporting the motor; at least one stud supported by the support bracket and supporting a gear which is transmitted with a driving force of the motor; and a heatproof member disposed between a frame fastening the support bracket and the stud.

The heatproof member can be fitted over an end of the stud. One end of the stud can be fixed by the support bracket, and the other end can be supported by the frame. The heatproof member can be connected to the other end of the stud to contact the frame. The other end of the stud can have a connection part having a smaller diameter so as to be inserted in the heatproof member.

The heatproof member can be made of a material selected from a group consisting of polyphenylene sulfide (PPS), polyethylene terephthalate (PET), and polybutylen terephthalate (PBT).

The foregoing and/or other aspects of the present general inventive concept can also be achieved by providing an image forming apparatus including a main body having a developing unit that develops an image on a paper, and a fusing unit; at least one driving unit having a motor that supplies a driving force to drive rollers mounted on a path of the paper, and a stud that supports a gear rotated by the driving force of the motor; a frame mounted in the main body to support the driving unit; and a heatproof member disposed between the frame and the stud.

The frame can include a support recess that supports an end of the stud, and the heatproof member can be fitted over the end of the stud to be connected to the end of the stud.

The driving unit can include a first driving unit to drive rollers mounted on a path extended from a position for paper pickup to the developing unit; and a second driving unit to drive rollers mounted on a path extending from the fusing unit to a position to provide paper discharging.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
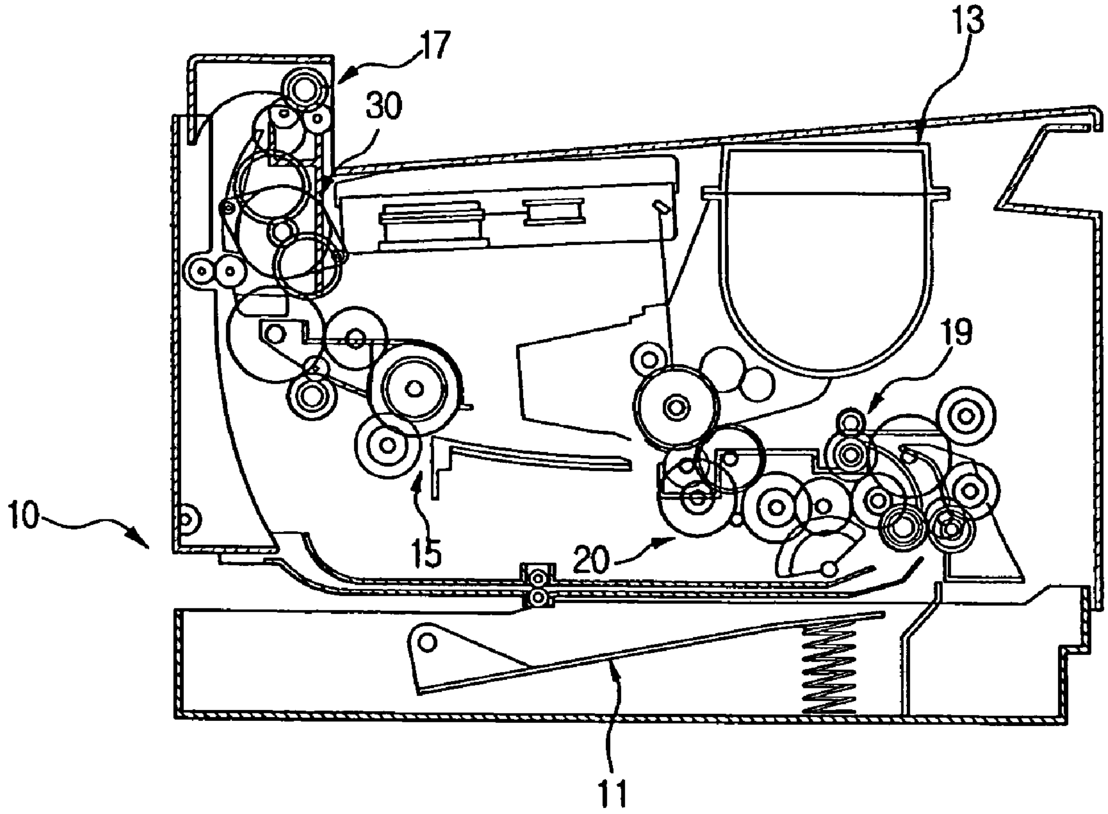
FIG. 1 is a sectional view outlining the construction of a driving unit and an image forming apparatus, according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 schematically shows the construction of an image forming apparatus according to an embodiment of the present general inventive concept. Referring to FIG. 1, a main body 10 of the image forming apparatus can include a paper feeding unit 11, a developing unit 13, a fusing unit 15, and a paper discharging unit 17 in order along a path where paper is conveyed. The respective units 13, 15 and 17 can include a rotatable drum or a roller. In the path, transfer rollers 19 are disposed at predetermined positions to transfer the paper.

A first driving unit 20 can be provided to supply a driving force for both the developing unit 13 and the transfer rollers 19 at a same time, and a second driving unit 30 can be provided to supply a driving force to the fusing unit 15 and the paper discharging unit 17.

The first driving unit 20 and the second driving unit 30 can transmit the driving force to the respective rollers and units as described above via a driving force transmission device which can include a gear train.

Figure 2:
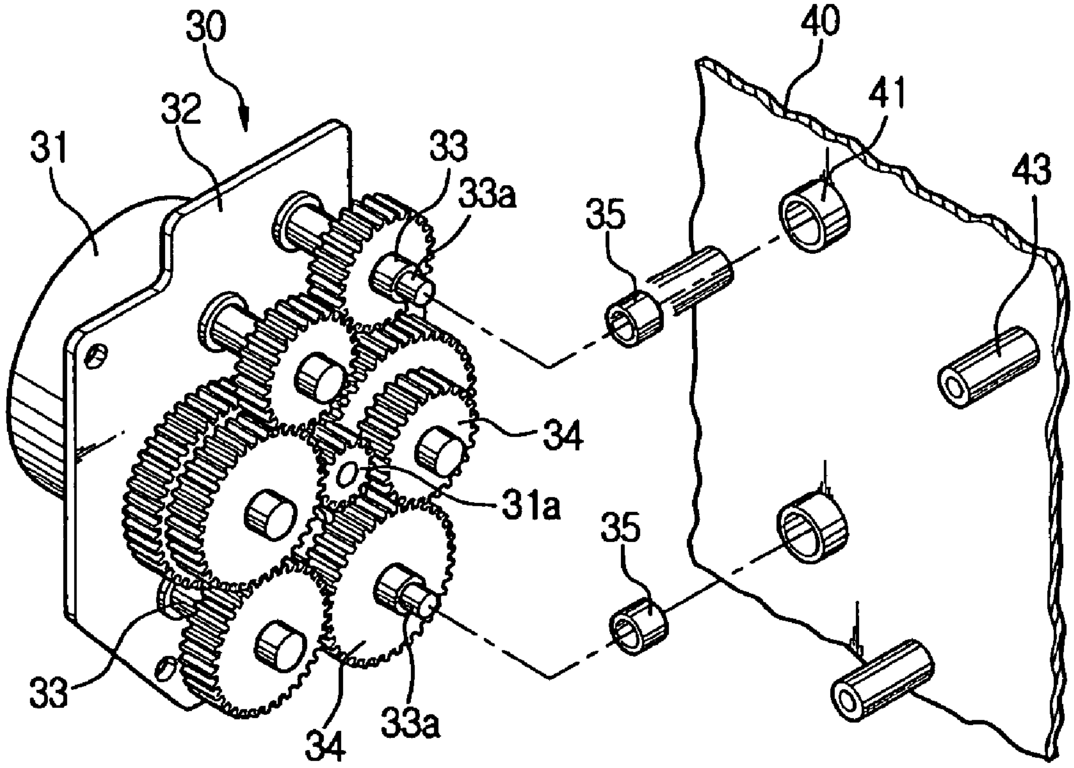
FIG. 2 is an exploded perspective view outlining the driving unit, according to an embodiment of the present general inventive concept.

FIG. 2 is an exploded perspective view outlining the second driving unit 30 according to an embodiment of the present general inventive concept. Referring to FIG. 2, the second driving unit 30 can include a motor 31, a support bracket 32 that supports the motor 31, a plurality of studs 33 fixed by the support bracket 32, a plurality of-gears 34 mounted in the respective studs 33, and a heatproof member 35 connected to an end of each of the studs 33. Both the first driving unit 20 and the second driving unit 30 can be supported by a frame 40 provided in the main body 10.

The support bracket 32 can be made of a metal, and can have the motor 31 fixed and supported at one side thereof. On the other side of the support bracket 32, a driving gear 31*a* can project therefrom which can be mounted on a driving shaft of the motor 31. A plurality of rotatable gears 34 can be connected to the driving gear 31*a*. The gears 34 can be rotatably supported by the respective studs 33.

Each of the studs 33 can be fixed to the support bracket 32 at one end thereof to operate as a rotation shaft of the gears 34. The stud 33 is usually made of a metal, although other materials can be used alternatively.

At least one of the studs 33 can have a connection part 33*a* at another end thereof, which has a smaller diameter than the stud 33. A heatproof member 35 can be connected to the connection part 33*a*.

The heatproof member 35 can prohibit a heat generated by driving of the motor 31 from being transmitted to the frame 40. More specifically, at least one of the plurality of studs 33 can be supported by the frame 40 at the other end thereof for its stability in a case of being shaken by the rotation of the gears 34. For this, the other end of the stud 33 can be inserted in a support recess 41 on the frame 40.

The heatproof member 35 can be inserted in and supported by the support recess 41, and can also be fitted with the another end of the stud 33. Therefore, the stud 33 typically does not directly contact the frame 40, and the heat is not typically transmitted from the stud 33 to the support recess 41. Thus, by preventing the stud 33 from contacting the frame 40 using the heatproof member 35, the support recess 41 of the frame 40, which can be made of a plastic, can be prevented from having heat transformed thereto. Accordingly, the stud 33 can be stably supported by the support recess 41 without being shaken or moved by vibration or impact of the gears 34. In addition, the gears 34 can rotate in a stable manner. As a result, the driving force can be efficiently transmitted, and deterioration of the image quality, such as a jitter, is restrained. A fastening boss 43 can be fastened to the frame 40 and the support brackets 32 by a screw to connect the support bracket 32 to the frame 40. Due to a length of the fastening boss 43, the support bracket 32 and the frame 40 are fastened to each other by a predetermined distance, and the gears 34 are interposed within the predetermined distance to rotate.

The heatproof member 35 may be formed as a cap to cover the stud 33, and be made of a plastic having a low thermal conductivity, such as, for example, a polyphenylene sulfide (PPS), a polyethylene terephthalate (PET), and a polybutylen terephthalate (PBT).

According to the driving unit and the image forming apparatus as described above, by the presence of the heatproof member 35 connected to the another end of the stud 33 which supports the gears 34, the heat of the stud 33 is not directly transmitted to the frame 40.

Accordingly, the support recesses 41 of the frame 40, which support the respective studs 33, are prevented from having the driving heat transferred thereto, thereby stably supporting the stud 33. Furthermore, transmission of the driving force also can be stably maintained, and degradation of the image quality, such as a jitter, can be restrained.

While FIG. 2 illustrates the second driving unit 30, a similar configuration can also be used for the first driving unit 20, and any other driving type unit.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A driving unit used with an image forming apparatus having a frame, the driving unit comprising:

a motor to turn gears;

a support bracket supporting the motor;

at least one stud to support the gears, the at least one stud having a first end supported by the support bracket and a second end supported by the frame;

a heatproof member disposed between the at least one stud and the frame, the frame supporting the support bracket, the heatproof member being connected to the second end of the at least one stud to contact the frame.

2. The driving unit of claim 1, wherein the heatproof member is fitted over an end of the stud.

3. The driving unit of claim 1, wherein a first end of the at least one stud is secured by the support bracket, and a second end of the at least one stud is supported by the frame.

4. The driving unit of claim 3, wherein the second end of the at least one stud has a connection part having a smaller diameter to be inserted in the heatproof member.

5. The driving unit of claim 1, wherein the heatproof member is made of a material selected from a group consisting of polyphenylene sulfide (PPS), polyethylene terephthalate (PET), and polybutylene terephthalate (PBT).

6. An image forming apparatus comprising:

a main body having a developing unit to develop an image on a paper, and a fusing unit;

at least one driving unit having a motor to supply a driving force to drive rollers mounted on a path of the paper, and a stud to support a gear rotated by the driving force of the motor;

a frame mounted in the main body to support the driving unit; and a heatproof member disposed between the frame and the gear to prevent a direct contact between the stud and the frame.

7. The image forming apparatus of claim 6, wherein the driving unit comprises:

a motor;

a support bracket to support the motor and a first end of the stud, and connected to the frame; and a gear mounted on the stud to rotate by the driving force of the motor.

8. The image forming apparatus of claim 7, wherein the frame includes a support recess to support an end of the stud, and the heatproof member is fitted on the second end of the stud to insert into the support recess.

9. The image forming apparatus of claim 7, wherein the heatproof member is disposed between a second end of the stud and the frame, the second end opposite the first end.

10. The image forming apparatus of claim 9, wherein the frame includes a support recess to support the second end of the stud, and the heatproof member is fitted with the second end of the stud to insert into the support recess.

11. The image forming apparatus of claim 9, wherein the first end of the stud has a first diameter and the second end of the stud has a connection part having a second diameter that is smaller than the first diameter so as to be inserted in the heatproof member.

12. The image forming apparatus of claim 6, wherein the driving unit comprises:

a first driving unit to drive rollers mounted on a path extending from a position for paper pickup to the developing unit; and a second driving unit to drive rollers mounted on a path extending from the fusing unit to a position for paper discharging.

13. The image forming apparatus of claim 6, wherein the gear comprises an opening portion extending along a central axis thereof, and the stud extends through the opening portion of the gear and contacts the frame.

14. The image forming apparatus of claim 6, wherein the heatproof member is fitted over an end of the stud.

15. A driving unit usable with an image forming apparatus, comprising:

a support bracket having a stud extending therefrom to support a gear;

a heatproof member disposed on an end of the stud; and a frame having a support recess coupled to the stud via the heatproof member.

16. A driving unit used with an image forming apparatus, comprising:

a frame a motor to turn at least one gear having an opening extending through an axis thereof;

a support bracket disposed opposite to the frame to support the motor;

at least one stud supported by the support bracket and extending through the opening of the at least one gear to support the at least one gear; and a heatproof member disposed between the at least one stud and the frame to prevent a direct contact between the at least one stud and the frame, the frame supporting the support bracket.

17. An image forming apparatus comprising:

a unit to convey paper;

a motor unit to generate a driving force;

a stud to receive the driving force from the driving unit;

a gear to transmit the driving force from the stud to the unit;

a frame and a support bracket to support the stud therebetween; and a heatproof member disposed between the stud and one of the frame and the support bracket to prevent a direct contact between the stud and one of the frame and the support bracket.

18. An image forming apparatus comprising:

a main body having a developing unit to develop an image on a paper, and a fusing unit;

at least one driving unit having a first driving unit to drive rollers mounted on a path extending from a position for paper pickup to the developing unit, a second driving unit to drive rollers mounted on a path extending from the fusing unit to a position for paper discharging, and a motor to supply a driving force to drive rollers mounted on a path of the paper, and a stud to support a gear rotated by the driving force of the motor;

a frame mounted in the main body to support the driving unit; and a heatproof member disposed between the frame and the gear.

* * * * *